July 19, 1932.  E. C. ANDERSON  1,867,792
CAR DOOR MECHANISM
Filed July 19, 1928  2 Sheets-Sheet 1

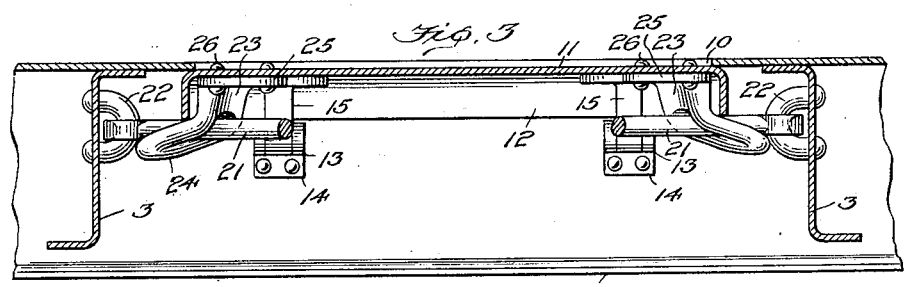
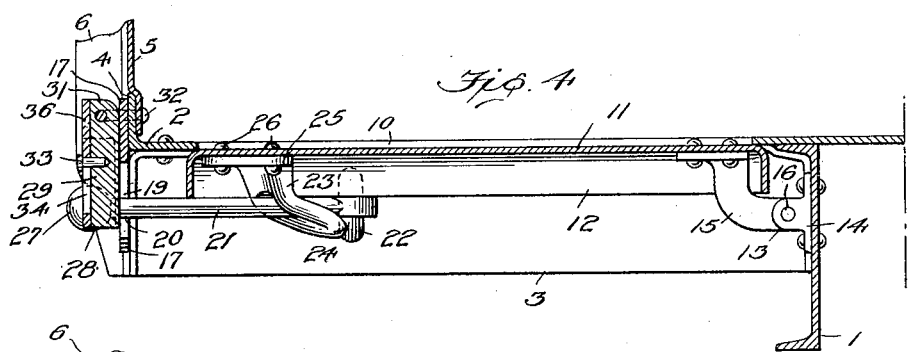
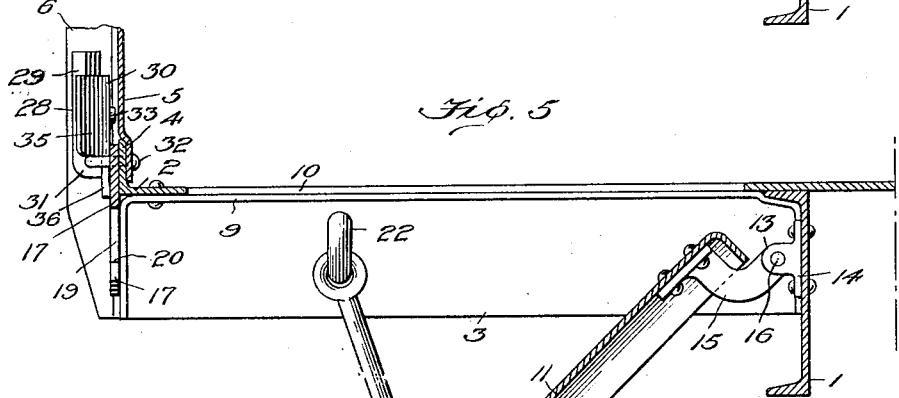
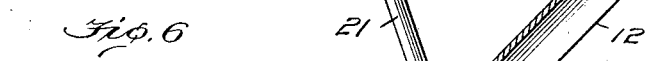
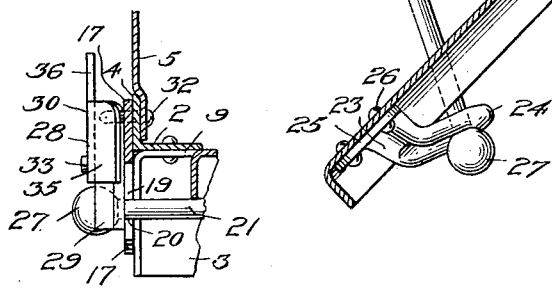

Patented July 19, 1932

1,867,792

UNITED STATES PATENT OFFICE

EMIL C. ANDERSON, OF DOWNERS GROVE, ILLINOIS, ASSIGNOR TO WINE RAILWAY APPLIANCE COMPANY, OF TOLEDO, OHIO, A CORPORATION OF OHIO

CAR DOOR MECHANISM

Application filed July 19, 1928. Serial No. 293,998.

My invention relates to door mechanisms for railway cars and is especially suitable for application to flat-bottom gondola cars, although it may advantageously be employed on cars of other types.

The principal object of the invention is to provide simple and reliable means for securely locking the door in closed position.

Another object of the invention is to so form and associate the locking mechanism with the door that it may be used to assist in the door closing operation.

A primary feature of the invention resides in providing the door mechanism with a member which is movably connected to the car body and is adapted to cooperate with the door to support it in closed position, one end of the member being cooperable with a shouldered member rigidly secured to the car body.

Another feature of the invention is to fashion the door locking mechanism with a member adapted to extend diagonally across a free corner of the door to support the latter in closed position.

A still further feature of the invention consists in constructing a door locking mechanism with a movable member and a fixed member, the fixed member being rigidly secured to the car body and the movable member being slidably connected to the door and pivotally mounted upon the car body.

A still further feature of the invention consists in associating with a hinged door of a flat-bottom gondola car mechanism for supporting it in closed position, the mechanism involving a member secured to the car body having a plurality of ledges and arms pivotally connected to the car body respectively cooperable with the said ledges.

A still further feature of the invention consists in providing a car door supporting mechanism with a plurality of arms, the arms being movable toward each other to permit the door to swing to open position and with means adapted to be interposed between the arms to prevent accidental release of the door.

Other features of the invention residing in particular combinations of parts and advantageous forms of the several parts of the mechanism will hereinafter appear and be pointed out in the claims.

In the drawings illustrating a preferred embodiment of the invention:

Figure 3 is a sectional view taken on line 3—3, Figure 1.

Figure 4 is a sectional view taken on line 4—4, Figure 1.

Figure 5 is a view similar to Figure 3, the door being shown in open position.

Figure 6 is a detail fragmentary sectional view showing the locking block in a position such that it may be rotated to permit the door supporting members or arms to be moved toward door releasing position.

Figure 1:
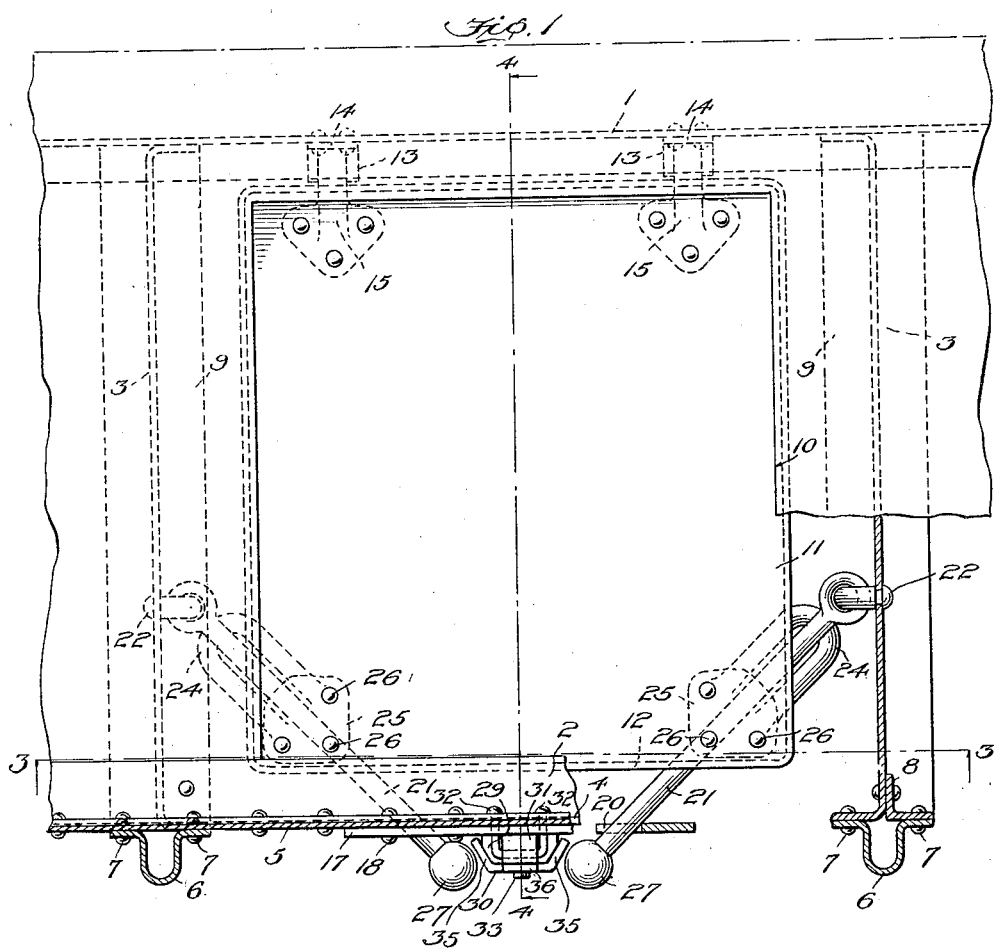
Figure 1 is a fragmentary plan view partly in section of a flat-bottom gondola car showing my invention applied thereto.
Figure 2:
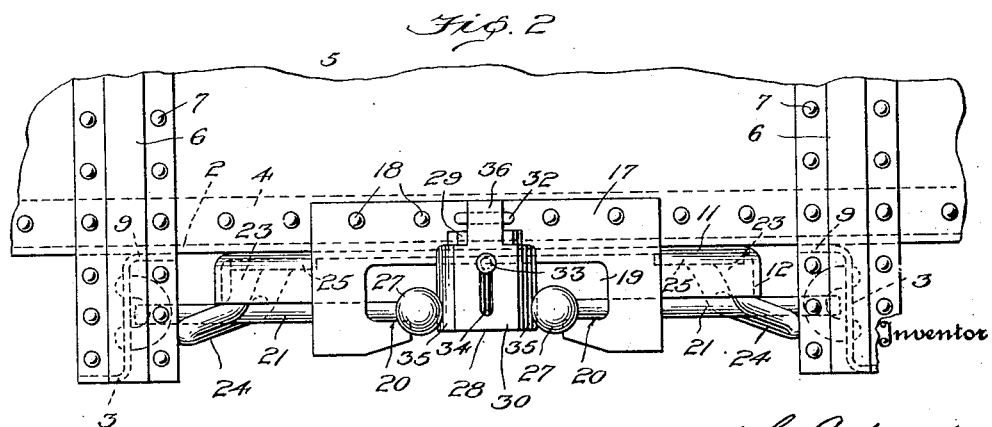
Figure 2 is a fragmentary side elevational view of the construction illustrated in Figure 1.

In the drawings, 1 and 2 indicate the center and side sills respectively which are rigidly secured together by a plurality of substantially Z-shaped transversely extending reinforcing members 3. Secured to the upstanding leg 4 of the side sill are car side sheets 5 and arranged in overlapping relation thereto are a plurality of side stakes 6, the stakes depending below the side sill affording means to which the outer ends of the respective reinforcing members 3 may be secured as by rivets 7. Angle pieces 8 may advantageously be employed to insure a very rigid connection between these parts.

Resting upon and secured to the upper horizontal flange 9 of the reinforcing members 3 is a floor plate having one or more apertures 10 forming openings to permit the discharge of lading from the car. The opening is adapted to be closed by a preferably sheet metal door 11 having downwardly extending marginal flanges 12 for reinforcing it. A plurality of brackets 13 are employed for hingedly connecting the door to the car body, the brackets being arranged so that the door may swing to open position under the influence of gravity. Each bracket is composed of two parts 14 and 15 respectively which are pivotally connected by hinge pintles 16, the part 14 being rigidly secured to the web of the center sill 1 and the part 15 being secured to the underside of the door 11.

Rigidly mounted upon the car structure, substantially centrally of and adjacent the free edge of the door 11 is a bracket or member 17. Rivets 18 may be employed for securing the bracket 17 to the car body, the rivets preferably passing through the upstanding leg 4 of the side sill. The lower central portion of the bracket is fashioned with a cut out portion 19 to form shoulders or ledges 20 designed to respectively cooperate with the outer ends of door support arms or members 21. The inner ends of each of the arms is formed with an eye to receive a bent rivet 22 employed for connecting the arms 21 to the webs of the respectively adjacent reinforcing members 3. This manner of connecting the arms 21 to the car body permits a universal movement thereof.

Instead of permitting independent movement of the door and its associated arms 21 the latter are slidably connected to the door by castings 23, each of which has a downwardly projecting laterally offset U-shaped extension 24 for receiving the adjacent arm 21. The castings 23 are each provided with a base plate 25 to afford means for receiving rivets 26 employed for securing them to the underside of the door. The extreme outer ends of the arms 21 are enlarged as at 27 to prevent disengagement of the latter from the U-shaped extensions 24 of the castings 23 and also to limit opening movement of the door.

When the door is in the position shown in Figure 5 and it is desired to move it to closed position the operator may grasp any convenient portion thereof such as the marginal flange 12 formed on the free edge of the door. Upon raising the door the arms 21 are automatically swung outwardly and upwardly into a position such that the operator may grasp either or both of them and continued upward movement of the door is caused by actuation of the arms 21. The arms may be simultaneously moved into the cut out portion 19 of the bracket 17 and then in opposite directions in a plane substantially parallel to that of the door so as to cause their outer ends to rest upon the ledges of shoulders 20. It will be appreciated that a mechanical advantage is obtained when the arms are employed to effect a closing movement of the door.

To prevent accidental movement of the arms 21 toward each other thereby permitting the door to swing to open position a locking block or member 28 is preferably employed. This locking block may advantageously be constructed of two relatively movable inner and outer parts 29 and 30 respectively. The inner member is fashioned with an upwardly projecting reduced extension 31 which is pivotally connected to an adjacent part of the car body, such as the upstanding leg 4 of the side sill, by a U-shaped rivet 32. The outer member 30 is slidably mounted upon the outer face of the inner member 29 of the locking block 28 by a pin or rivet 33 which extends through the elongated slot 34 formed in the central portion of the member 30. The side portions 35 of the outer member 30 diverge outwardly toward the car body and have sliding engagement with the similarly formed side portions of the inner member 29. The sides 35 are so formed and proportioned that when the locking block is interposed between the outer ends of the arms 21 rotation thereof is impossible. Thus when it is desired to move the arms inwardly to permit the door to swing to open position it is first necessary that the outer member 30 of the block be moved upwardly with respect to its inner part 29 until the lower portion of the former clears the top surface of the arms 21 as clearly shown in Figure 6. The block may then be swung outwardly as a unit past the outer ends of the arms 21, the outer member 30 being then permitted to move downwardly so that the block may be rotated through an angle of 180° and lie parallel in an inverted position with the side of the car. In order to sustain the block in this position it is fashioned with an upwardly projecting part 36 which, when the block is in the inverted position shown in Figure 5, functions to prevent rotation of the locking block in a counter-clockwise direction. After the door has been supported in closed position by the arms 21 being brought into proper engagement with their cooperating ledges the locking block may be rotated into a position between the outer ends of the arms 21 to prevent them from moving toward each other by first raising the outer member 30, then rotating the block in a counter clockwise direction until it engages with the arms 21, then elevating the outer member 30 to permit the block to pass between the arms 21 and then permitting the member 30 to gravitate downwardly.

From the foregoing it will be perceived that the locking mechanism is strong and rugged and will efficiently perform the purposes for which it has been designed.

I claim:

1. In a car door mechanism, the combination with a hinged door adapted to swing to open position under the influence of gravity, of a shouldered member rigidly secured to the car body adjacent the free edge of the door, and a unitary rigid member movably connected to the car body inwardly of the free edge of the door and cooperable with the shouldered member and the door to support the latter in closed position.

2. In a car door mechanism, the combination with a hinged door adapted to swing to open position under the influence of gravity, of a rigid arm slidably connected to the door and having one of its ends pivotally connected to the car body, and a shouldered member rigidly secured to the car body and engageable with the opposite end of said arm to support the door in closed position.

3. In a car door mechanism, the combination with a hinged door adapted to swing to open position under the influence of gravity, of a member adapted to extend diagonally across a corner of the door for supporting the latter in closed position, one end of said member being pivotally connected to the car body.

4. In a car door mechanism, the combination with a hinged door adapted to swing to open position under the influence of gravity, the hinge axis of the door extending longitudinally of the car, of a shouldered member rigidly secured to the car body, and a member operatively associated with the door for supporting it in closed position, one end of said member being engageable with the ledge member and the opposite end thereof being pivotally connected to the car body intermediate the hinged and free edge of the door.

5. In a car door mechanism, the combination with a hinged door adapted to swing to open position under the influence of gravity, of a movable member mounted upon the car body, a U-shaped member carried by the door for slidably connecting the said movable member to the latter, and a shouldered member rigidly secured to the car body and cooperable with the movable member for maintaining the door in closed position.

6. In a car door mechanism, the combination with a hinged door adapted to swing to open position under the influence of gravity, of a member rigidly secured to the car body, and a member having universal pivotal connection to the car body and slidably connected to the door, said pivoted member being adapted to project beyond an edge of the door for cooperating with said rigid member to support the door in closed position.

7. In a car door mechanism, the combination with a hinged door adapted to swing to open position under the influence of gravity, of means for supporting the door in closed position involving a universally pivoted member and a shouldered member, both of said members being connected to the car body, and means on the door cooperable with the pivoted member for limiting opening movement of the door.

8. In a flat-bottom gondola railway car having a lading discharge opening, the combination with a hinged door for closing said opening, the door being movable to open position under the influence of gravity, of mechanism for supporting the door in closed position involving a plurality of universally pivoted arms mounted on the car body, and means respectively cooperable with said arms, said means being rigidly secured to the car body.

9. In a flat-bottom gondola railway car having a lading discharge opening, the combination with a hinged door for closing said opening, the door being movable to open position under the influence of gravity, of a member rigidly secured to the car body having a plurality of ledges, and arms having universal pivotal connection to the car body and respectively cooperable with the said ledges for maintaining the door in closed position.

10. In a flat-bottom gondola railway car having a lading discharge opening, the combination with a hinged door for closing said opening the door being movable to open position under the influence of gravity, of a member rigidly secured to the car body having a plurality of ledges, and arms respectively cooperable with said ledges for supporting the door in closed position, said arms being movable relatively to the door and being pivotally connected to the car body adjacent the opposite side edge of the door.

11. In a flat-bottom gondola railway car having a lading discharge opening, the combination with a hinged door for closing said opening, the hinged axis of the door extending longitudinally of the car and the door being movable to open position under the influence of gravity, of mechanism for supporting the door in closed position involving a plurality of arms respectively pivotally secured to the car body adjacent opposite side edges of the door, and means secured to the car body adjacent the free edge of the door for cooperating with said arms, the latter being movable in a plane parallel to that of said door to permit it to swing to open position.

12. In a flat-bottom gondola railway car having a lading discharge opening, the combination with a hinged door for closing said opening, the door being movable to open position under the influence of gravity, of mechanism for supporting the door in closed position involving a plurality of arms, said arms when in supporting cooperation with the door being adapted to respectively extend diagonally across the opposite free corners of the door.

13. In a flat-bottom gondola railway car having a lading discharge opening, the combination with a hinged door for closing said opening, the door being movable to open position under the influence of gravity, of mechanism for supporting the door in closed position involving a member rigidly secured to the car body and a plurality of universally pivoted arms connected to the car body adjacent opposite side edges of the door for engaging said member, said arms being movable in a plane parallel to that of the door and in opposite directions to disengage said member and thereby permit the door to swing to open position.

14. In a flat-bottom gondola car provided with transversely extending reinforcing members and having a lading discharge opening intermediate said reinforcing members, the combination with a door for closing said opening, the door being movable to open position under the influence of gravity, of mechanism for supporting said door in closed position involving a plurality of arms respectively secured to said reinforcing members, and a member secured to the car side having a plurality of ledges, said arms being slidably connected to the door and respectively cooperable with said ledges.

15. In a flat-bottom gondola railway car having a lading discharge opening, the combination with a door for closing said opening, said door being adapted to move to open position under the influence of gravity, of mechanism for maintaining the door in closed position involving a plurality of arms movably connected to the car body, said arms being movable toward each other in a plane parallel to that of the door to permit the latter to swing to open position, and means adapted to be interposed between said arms to maintain them in door supporting position.

16. In a flat-bottom gondola railway car having a lading discharge opening, the combination with a door for closing said opening, said door being adapted to move to open position under the influence of gravity, of mechanism for maintaining the door in closed position involving a plurality of arms movably connected to the car body, said arms being movable toward each other in a plane parallel to that of the door to permit the latter to swing to open position, and vertically movable means adapted to be interposed between said arms to maintain them in door supporting position.

17. In a car door mechanism, the combination with a hinged door adapted to swing to open position under the influence of gravity, a plurality of arms respectively movably secured to the car body adjacent opposite side edges of the door for supporting the latter in closed position, said arms being movable toward each other to permit the door to swing to open position, and means adapted to be interposed between the arms to maintain them in door supporting position, said means involving two relatively slidable members one of which is pivotally connected to the car body.

18. In a car door mechanism the combination with the hinged door adapted to swing to open position under the influence of gravity, of an arm for supporting the door in closed position, one end of said arm being pivotally connected to the car body and the other end thereof being adapted to project beyond the free edge of the door when the latter is in closed position, said arm being movable with the door and being adapted to serve as a lever for forcing it to closed position.

19. In a car door mechanism, the combination with a hinged door adapted to swing to open position under the influence of gravity, of an arm movably connected to the car body and engageable with the door, and means mounted on the car body and cooperable with said arm to maintain the door in closed position, said arm being adapted to serve as a lever to force the door to closed position and being further adapted to move in a plane parallel with that of the door into engagement with said means.

20. In a car door mechanism, the combination with a hinged door adapted to swing to open position under the influence of gravity, of an arm movable relatively to the door for supporting the latter in closed position, one end of said arm being pivotally connected to the car body and the other end thereof being adapted to project beyond the free edge of the door when the latter is in closed position.

21. In a car door mechanism, the combination with a hinged door adapted to swing to open position under the influence of gravity, of a ledge member rigidly secured to the car body adjacent the free edge of the door, and an arm movable relatively to the door having one of its ends pivotally connected to the car body adjacent a side edge of the door, the other end of said arm projecting outwardly beyond the free edge of the door for cooperating with said ledge member to support the door in closed position, said arm when in door supporting position being disposed in a plane substantially parallel with that of the door.

22. In a car door mechanism, the combination with a hinged door adapted to swing to open position under the influence of gravity, of a member rigid with the car body, and an arm having universal pivotal connection to the car body for cooperating with said member to support the door in closed position, said arm being adapted to serve as a lever for forcing the door to closed position.

23. In a car door mechanism, the combination with a hinged door movable to open position under the influence of gravity, of a member rigid with the car body adjacent the free edge of the door, and an arm having universal pivotal connection to the car body and slidable connection with the door, said arm being engageable with said member for supporting the door in closed position and being adapted to serve as a lever for forcing the door to closed position.

In testimony whereof I affix my signature.

EMIL C. ANDERSON.